E. B. & G. E. ROEDDING.
VEHICLE SIGNAL.
APPLICATION FILED MAY 19, 1913.
1,080,589.
Patented Dec. 9, 1913.
3 SHEETS—SHEET 1.
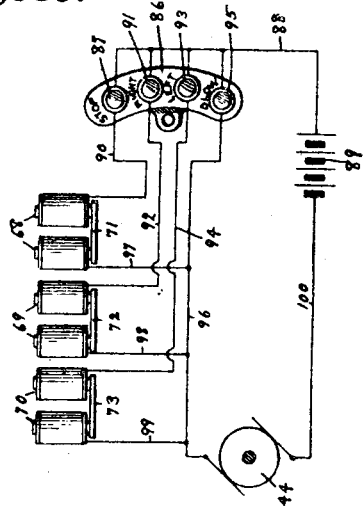
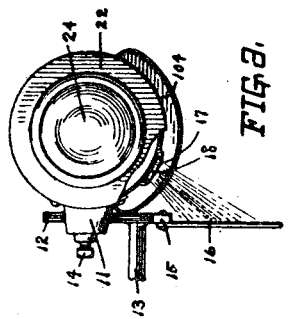
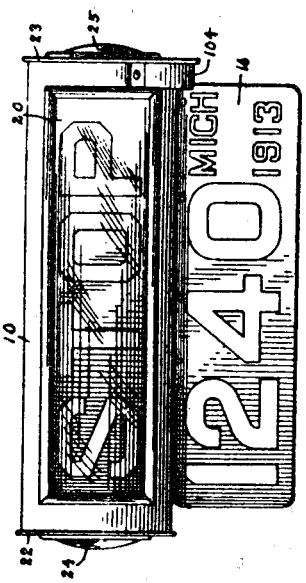
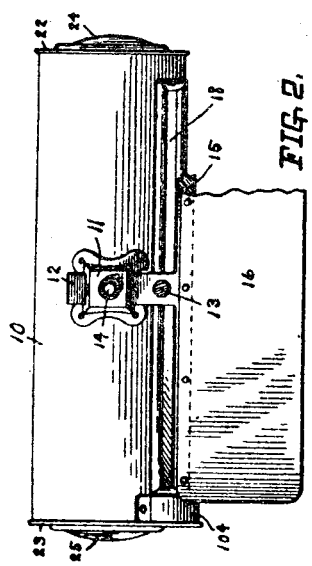
Witnesses
Hugo W. Kreinbring
Mary A. Hawthorne
Inventors
E. B. Roedding &
G. E. Roedding
By Edward N. Pagelsen
Attorney

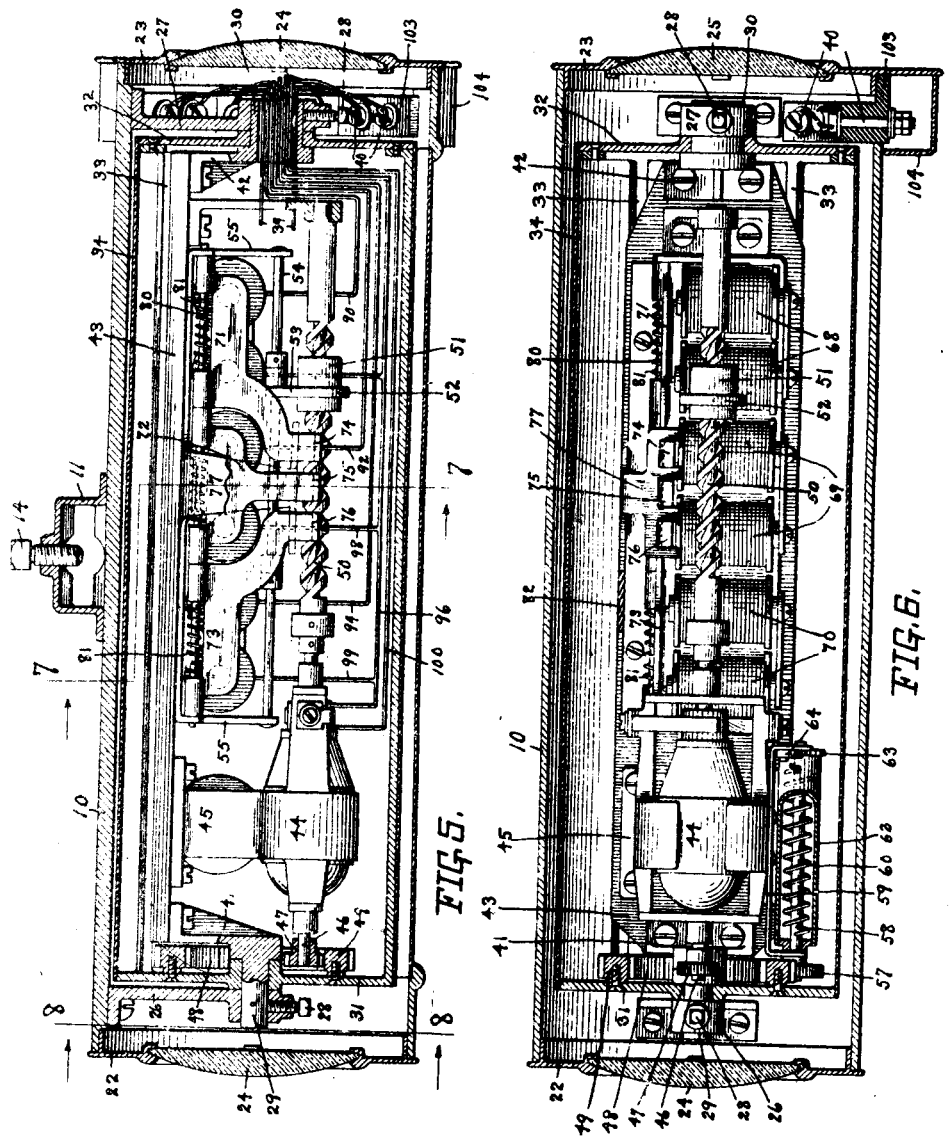

E. B. & G. E. ROEDDING.
VEHICLE SIGNAL.
APPLICATION FILED MAY 19, 1913.
1,080,589.
Patented Dec. 9, 1913.
3 SHEETS—SHEET 3.
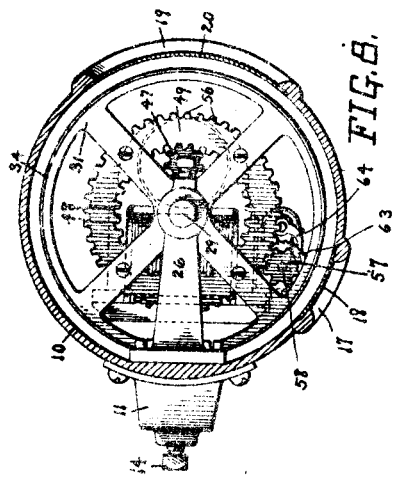
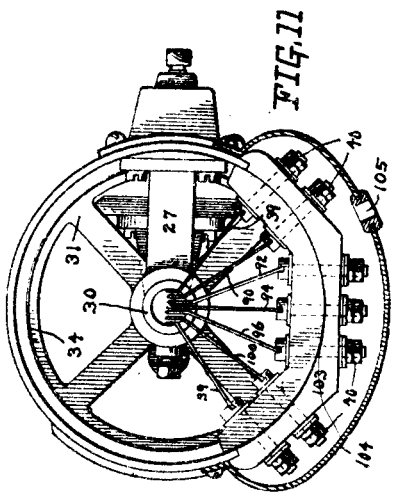
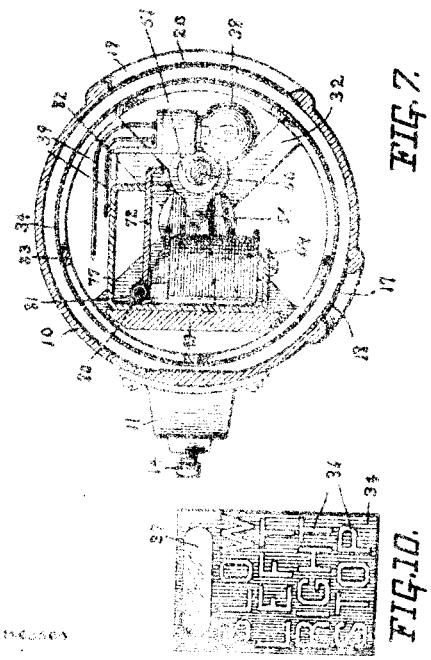
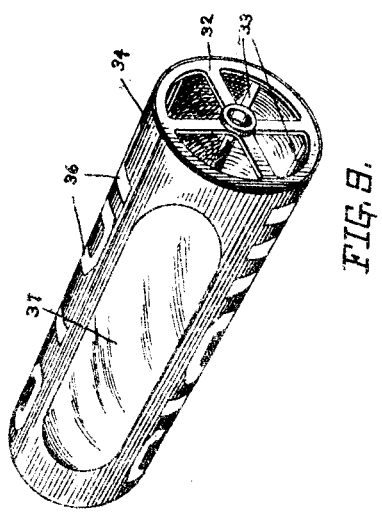
Inventors
E. B. Roedding &
G. E. Roedding.
By Edward N. Pagelsen.
Attorney

UNITED STATES PATENT OFFICE.

EDWARD BRUCE ROEDDING AND GORDON E. ROEDDING, OF DETROIT, MICHIGAN.

VEHICLE-SIGNAL.

1,080,589.

Specification of Letters Patent.   Patented Dec. 9, 1913.

Application filed May 19, 1913.   Serial No. 768,584.

*To all whom it may concern:*

Be it known that we, EDWARD BRUCE ROEDDING and GORDON E. ROEDDING, citizens of the United States, residing at Detroit, in the county of Wayne and State of Michigan, have invented a new and Improved Vehicle-Signal, of which the following is a specification.

This invention relates to signals adapted to be mounted on the rear ends of automobiles and other vehicles for the purpose of communicating to the drivers or conductors of vehicles which are following the intentions of the drivers of the vehicles in advance; and its object is to provide a simple and efficient mechanism which will indicate such intentions clearly and accurately.

This invention consists, in combination with a proper case, of a light hollow cylinder revolubly mounted therein and having its surface provided with groups of letters, a lamp mounted within the cylinder, and a motor mounted within the cylinder and connected thereto in such a manner that the cylinder may be revolved thereby.

It further consists in combination with the case, cylinder and motor, of electrically energized controlling devices for stopping the cylinder at any one of a series of predetermined points.

In the accompanying drawings Figure 1 is a front elevation and Fig. 2 is a rear elevation of this improved signaling device, the front and rear in this case being taken with reference to the signal and not to the vehicle upon which the signal is mounted. Fig. 3 is an end elevation of the lamp taken from the left in Fig. 1. Fig. 4 is a diagram of the electric circuits employed. Fig. 5 is a horizontal longitudinal section of this improved device and Fig. 6 is a vertical longitudinal section of the same. Fig. 7 is a section on the line 7—7 of Fig. 5. Fig. 8 is a section on the line 8—8 of Fig. 5. Fig. 9 is a perspective of the revoluble cylinder. Fig. 10 is a development of the surface of the cylinder. Fig. 11 is an end elevation from the right in Fig. 1 showing the case with the end cap removed and the guard broken away to show the hole for the passage of the line wires.

Similar reference characters refer to like parts throughout the several views.

When automobiles closely follow each other and the driver of the vehicle ahead desires to change his speed or direction, there is great danger of its being run into by the vehicle next behind. It is therefore desirable that means be provided whereby the driver of the vehicle ahead may communicate his intentions to the driver of the vehicle following. For this purpose a signaling device has been designed consisting generally of a case 10, preferably cylindrical, having secured to it a sleeve 11 so constructed that it may be slipped over an arm 12 projecting upwardly from the bar 13 and be supported thereby, on which arm the sleeve may be rigidly held by means of a set-screw 14. A cross bar 15 may be connected to this arm 12 and carry the license tag 16 of the vehicle. The case may be provided with a longitudinal opening 17 covered by a sheet 18 of glass, through which rays of light may fall at night onto this license tag 16.

The front of the case is provided with an opening 19 in which may be mounted a sheet 20 of glass or other transparent material, so that the rays of light may be thrown backward from the vehicle. Caps 22 and 23 are formed to fit the ends of the case and may be provided with lenses 24 and 25 if desired, which may be of any desired color so as to conform to the usual police regulations.

Mounted in the case, as shown in Fig. 5, are two brackets 26 and 27, provided with set-screws 28 which centrally support the trunnions 29 and 30, the latter being hollow to permit the passage of the wires by which electricity is conveyed to the mechanism. Revolubly mounted on these trunnions are the circular heads 31 and 32 which are connected by cross bars 33, as shown in Fig. 11, around which the shell 34 of the indicating cylinder extends. This shell may be of metal or of some transparent material. If of metal, letters 36 and a large opening 37 may be cut therein and a sheet of transparent cloth, paper or similar material cemented to the inside of the shell over these letters and the opening 37, the sheet over the opening 37 being red. If the cylinder is made of celluloid or other normally transparent material, it may be colored black except where the letters 36 occur, where it may be left uncolored, and be colored red at the space marked 37 in Fig. 10.

An electric lamp 38 is mounted in the case within the cylinder and has wires 39 which extend out through the bore of the trunnion 30 to two of the binding posts 40, which connect to wires from the current source. When current flows over these wires, the ignited lamp will illuminate the interior of the shell 34 and normally shine through the red portion 37 and through the window 20. When the indicating cylinder is revolved one, two, three or four steps, as may be desired, the words Slow, Left, Right, and Stop will be between the light and the window 20, and these words will stand out at night when the lamp 38 burns in bright letters at this window, notifying the drivers of the vehicles in the rear of the intention of the driver. The order of these words on the cylinder is immaterial and may be modified as desired. During daylight the lamp circuit will be open, but the contrast of the light letters on the black background just back of the glass 20 will render the words visible to the drivers of vehicles following.

The trunnions 29 and 30 connect to the arms 41 and 42 which carry a plate 43 on which the actuating motor 44 is mounted, which plate is therefore rigid with the case. This motor may be of any desired type, and may have a base 45 connected to the plate 43. One end of its armature shaft 46 carries a pinion 47 which meshes with the internal teeth 48 of the gear 49, secured to the head 21. The other end of this shaft connects to the spiral 50 on which is mounted a nut 51 having a collar 52 provided with an arm 53 which is perforated so as to be slidable on the rod 54 mounted in the arms 55, which are secured to or integral with the plate 43. As the armature shaft revolves, the nut 51 will be moved to the right or left, depending upon the direction of the revolutions of the spiral, and as the pinion 47 meshes with the internal teeth 48 of the gear 49 which is connected to the head 21 of the indicating cylinder, the longitudinal movement of the nut 51 along the spiral 50 will be in proportion to the degree of revolution of the cylinder 34. The toothed ring 48 may also be provided with external teeth 56 which mesh with the teeth of the small pinion 57 on the shaft 58, which is mounted in a bracket 59, preferably carried by the housing of the motor 44, as shown in Fig. 6. The spring 60 is connected to this shaft within a revoluble sleeve or shell 62, centered on the shaft 58, and a small ratchet-wheel 63, also connected to this shell, is engaged by a pawl 64 mounted on the bracket 59. By means of this pawl, ratchet-wheel 63 and shell 62, the tension of the spring 60 may be predetermined.

When the motor is energized, it revolves to the right (in Fig. 3) and turns the pinion 57 and shaft 58 to the left and winds up the spring 60, at the same time turning the cylinder 34 to the right and bringing the words Slow, Left, Right, and Stop between the lamp 38 and the window 20 in the order named, or if these words are placed and arranged as shown. When the proper word has reached this window, the motor is stopped, and after the desired length of time, the motor is de-energized and the spring 60 turns the motor and the cylinder 34 backward to starting position. The means for stopping this motor and cylinder at the desired points are as follows: Mounted on the plate 43 are pairs of electro-magnets 68, 69 and 70. These magnets have armatures 71, 72 and 73 provided with arms 74, 75 and 76 respectively, which are guided between the fingers on the bracket 77 as shown in Fig. 6. Each of these arms 74, 75 and 76 are normally out of the path of the nut 51, but when the proper magnet is energized, its armature swings toward the spiral 50 and its arm extends into the path of this nut, so that when the motor is energized and revolves the spiral 50, this nut will engage one of the arms 74, 75 or 76, which will result in the stopping of the motor. Where the cylinder 34 is provided with four words besides the red space 37, the distance that the collar 52 can travel longitudinally of the spiral 50 before it strikes the arm 74, will be one-half of the distance which it travels before it strikes the arm 75 and one-third of the distance it travels before it strikes the arm 76, and each distance will be sufficient to permit the shaft 46 to turn through the necessary number of degrees for the pinion 47 to revolve the gear 48 and the cylinder 34 one, two or three fifths of a revolution. All of these armatures may be mounted on a shaft 80 carried by the bracket 55, and may be normally held outward by springs 81 on this shaft. An arm 82 extending forwardly from the plate 43 may be employed to carry the lamp 38. The controlling devices for this mechanism may be mounted at any desired position on the vehicle or grouped as shown in Fig. 4, on a plate 86. A button 87 may close the circuit from the line 88 leading from the battery 89 to the line 90 leading to the magnet 68; the button 91 the circuit of the line 92 to the magnet 69; the button 93 the circuit of the line 94 to the magnet 70; while the button 95 may close the circuit of the line 96 leading directly to the motor 44. Wires 97, 98 and 99 will preferably connect this line 96 to the windings of the magnets as indicated in Fig. 4, and line 100 connects the motor to the battery. All these lines will preferably be fully insulated. When the button 87 is depressed, a current will flow from the battery over the lines 88 and 90 to the electro-magnet 68, thence over the line 97 and the line 96 to the motor, and thence to the current source. This will result in the energizing of the motor and at the same time in the arm 74 being swung into the path of the nut 51; in the cylinder 34's being turned by the motor; and in the arm 74's stopping this movement of the motor and cylinder at the end of one-fifth of a revolution of the latter. If the button 93 is depressed, the cylinder will be turned three-fifths of a revolution, while if the button 95 is depressed, the current will flow directly from the current source to the motor, and the collar 57 will travel along the spiral 50 until the end of the spiral is reached, which will permit the cylinder 34's being turned four-fifths of a revolution. As soon as the pressed button is released, the motor becomes deënergized and the spring 60 will turn the motor, spiral and indicating cylinder back through the revolutions just made.

The binding posts 40 may be secured in the case 10 in any desired manner. They are shown mounted in a block 103 secured in one end of the case, which block may be of insulating material. A shield 104 may be secured to the case over the outer ends of these posts 40 and be provided with an opening 105 to permit the entrance of connecting wires to be attached to these posts, which wires connect to the switches which control the current to the electro-magnets, motor and lamp.

While this signal is peculiarly adapted for vehicles, it will be clear that it is not limited thereto, but that it may be employed wherever desirable to indicate changes of conditions by words or characters.

The details of construction and proportions of parts may all be changed without departing from the spirit of invention set forth in the claims.

We claim—

1. In a signal, the combination of a case having a longitudinal window, a pair of brackets mounted in the case, a support rigidly secured in said brackets and comprising journals adjacent the brackets, circular heads revolubly mounted on the journals, a cylindrical shell secured to said heads and having a plurality of groups of characters on its surface, which may be successively presented to said window, resilient means to return the shell to normal position, an electric motor mounted on said support within the shell, a series of stop devices mounted within the shell to control the revolutions of the motor and cylindrical shell, and means for controlling the action of said stop devices.

2. In a signal, the combination of a case having a window, a cylinder revolubly mounted in said case and having a plurality of groups of transparent and opaque sections constituting its shell, which sections may be successively presented to said window, a gear concentric with said cylinder and secured thereto, stationary means to support the cylinder, means engaging the gear to return the cylinder to normal position, an electric motor mounted on said supporting means within the cylinder, a gear on the motor shaft meshing with the gear on the cylinder, and a plurality of devices each adapted for stopping the cylinder and motor when the cylinder has been turned the desired distance.

3. In a signal, the combination of a case having a window, a cylinder revolubly mounted in said case and having a plurality of groups of transparent and opaque sections constituting its shell, which sections may be successively presented to said window, a gear concentric with said cylinder and secured thereto, means engaging said gear to return the cylinder to normal position, stationary means to support the cylinder, an electric motor mounted on said supporting means within the cylinder, a gear on the motor shaft meshing with the gear on the cylinder, and a plurality of devices each adapted for stopping the cylinder and motor when the cylinder has been turned the desired distance, and a lamp mounted within the cylinder.

4. In a signal, the combination of a case having a window, a cylinder revolubly mounted in said case and having a plurality of groups of transparent and opaque sections constituting its shell, which sections may be successively presented to said window, a gear concentric with said cylinder and secured thereto, means engaging said gear to return the cylinder to normal position, stationary means to support the cylinder, an electric motor mounted on said supporting means within the cylinder, a gear on the motor shaft meshing with the gear on the cylinder, devices for stopping the cylinder and motor when the cylinder has been turned the desired distance, a bracket mounted on the motor support, and a lamp carried by said bracket within the cylinder.

5. In a signal, the combination of a case having a window, a cylinder revolubly mounted in the case and having a plurality of groups of transparent characters on its surface, which sections may be successively presented to said window, stationary means to support said cylinder, an electric motor mounted on said supporting means, a gear connected to said cylinder, a pinion mounted on the motor shaft and meshing with said gear, a spirally grooved shaft connected to said motor shaft, a nut slidable thereon, a series of electro-magnets and armatures therefor adapted to be swung into the path of said nut to stop it and the rotations of the motor and cylinder at any one of a plurality of predetermined points.

6. In a signal, the combination of a case having a window, a cylinder revolubly mounted in the case and having a plurality of groups of transparent characters on its surface, which sections may be successively presented to said window, stationary means to support said cylinder, an electric motor mounted on said supporting means, a gear connected to said cylinder, a pinion mounted on the motor shaft and meshing with said gear, a spirally grooved shaft connected to said motor shaft, a nut slidable thereon, a series of electro-magnets and armatures therefor adapted to be swung into the path of said nut to stop it and the rotations of the motor and cylinder at any one of a plurality of predetermined points, and manually operated means to control the action of said electro-magnets.

7. In a signal, the combination of a case having a window, a cylinder revolubly mounted in said case and having a plurality of groups of characters on its surface which may be successively presented to said window, an electric motor mounted in said case within the cylinder and operatively connected to said cylinder, means to control the movement of said motor and cylinder, electric circuits leading to said motor and controlling means, and a spring connected to and tensioned by said cylinder when the cylinder is turned by the motor and adapted to turn back the cylinder to normal position.

8. In a signal, the combination of a case having a window, a cylinder revolubly mounted in the case and having a plurality of groups of transparent characters on its surface, which sections may be successively presented to said window, stationary means to support said cylinder, an electric motor mounted on said supporting means, a gear connected to said cylinder, a pinion mounted on the motor shaft and meshing with said gear, a spirally grooved shaft connected to said motor shaft, a nut slidable thereon, a series of electro-magnets and armatures therefor adapted to be swung into the path of said nut to stop it and the rotations of the motor and cylinder at any one of a plurality of predetermined points, a shaft revolubly mounted adjacent the motor, a pinion on the shaft in mesh with said gear, and a spring on said shaft adapted to be wound up as the motor revolves the cylinder and to unwind to return the cylinder to normal position when the motor is deënergized.

9. In a signal, the combination of a case having a window, a cylinder revolubly mounted in said case and having a plurality of groups of characters on its surface which may be successively presented to said window, an electric motor mounted in said case within the cylinder and operatively connected to said cylinder, means to control the movement of said motor and cylinder, electric circuits leading to said motor and controlling means, a spring connected to and tensioned by said cylinder when the cylinder is turned by the motor and adapted to turn back the cylinder to normal position, and means to adjust the tension of the spring.

10. In a signal, the combination of a cylindrical case having a window, a bracket mounted in each end of the case and having a bearing at its outer end, a motor support within the case comprising a plate, arms at the ends of the plate and trunnions on the arms extending into the bearings of said brackets, one of said trunnions being formed hollow, a circular head mounted on each trunnion, an indicating cylinder on said heads surrounding said plate and arms, a motor mounted on said plate within the cylinder, gears connecting the motor and cylinder, stopping devices for said motor including a spiral shaft, a nut thereon, electromagnets and their armatures, and electric wires for the magnets and motor extending through the hollow trunnion into the cylinder.

In testimony whereof we have signed this specification in the presence of two subscribing witnesses.

EDWARD BRUCE ROEDDING.
GORDON ROEDDING.

Witnesses:
JAY FULLER,
EDWARD N. PAGELSEN.